United States Patent [19]
Entz

[11] Patent Number: 6,019,309
[45] Date of Patent: Feb. 1, 2000

[54] CASSETTE FOR PHOTOSENSITIVE MATERIAL

[75] Inventor: Steven F. Entz, Albion, N.Y.

[73] Assignee: Eastman Kodak Company, Rochester, N.Y.

[21] Appl. No.: 09/014,803

[22] Filed: Jan. 28, 1998

[51] Int. Cl.[7] .......................... B65D 85/02; G03B 23/02
[52] U.S. Cl. ...................... 242/588.5; 242/348.4
[58] Field of Search ............... 242/588.5, 348.4, 242/538.4; 396/511, 512

[56] References Cited

U.S. PATENT DOCUMENTS

| | | |
|---|---|---|
| 2,213,776 | 9/1940 | Walter .............................. 242/348.4 X |
| 2,298,339 | 10/1942 | Boes . |
| 3,544,039 | 12/1970 | Lunch et al. . |
| 3,550,882 | 12/1970 | Craven et al. . |
| 4,779,110 | 10/1988 | Stella ............................... 242/348.4 X |
| 5,053,795 | 10/1991 | Wyman ............................ 242/348.4 X |

Primary Examiner—John Q. Nguyen
Attorney, Agent, or Firm—Gordon M. Stewart; David A. Novais

[57] ABSTRACT

A photographic cassette, has a core retainer to rotatably seat a photographic web roll core along an axis of the retainer. The cassette further has a housing with an exterior and interior members each with a main wall which extends axially and part way around the axis, the main wall of each having an axially extending first margin. In the cassette one of the members is rotatable around the axis between a closed position in which first margins of the housing members abut one another so that a web roll with a core seated in the core retainer is light tightly enclosed by the housing, and an open position in which the first margins are separated to expose an axially extending cassette opening and in which the rotatable member further radially overlaps the other member than when in the open position. A method of loading such a cassette and dispensing photosensitive material, is also provided.

22 Claims, 13 Drawing Sheets

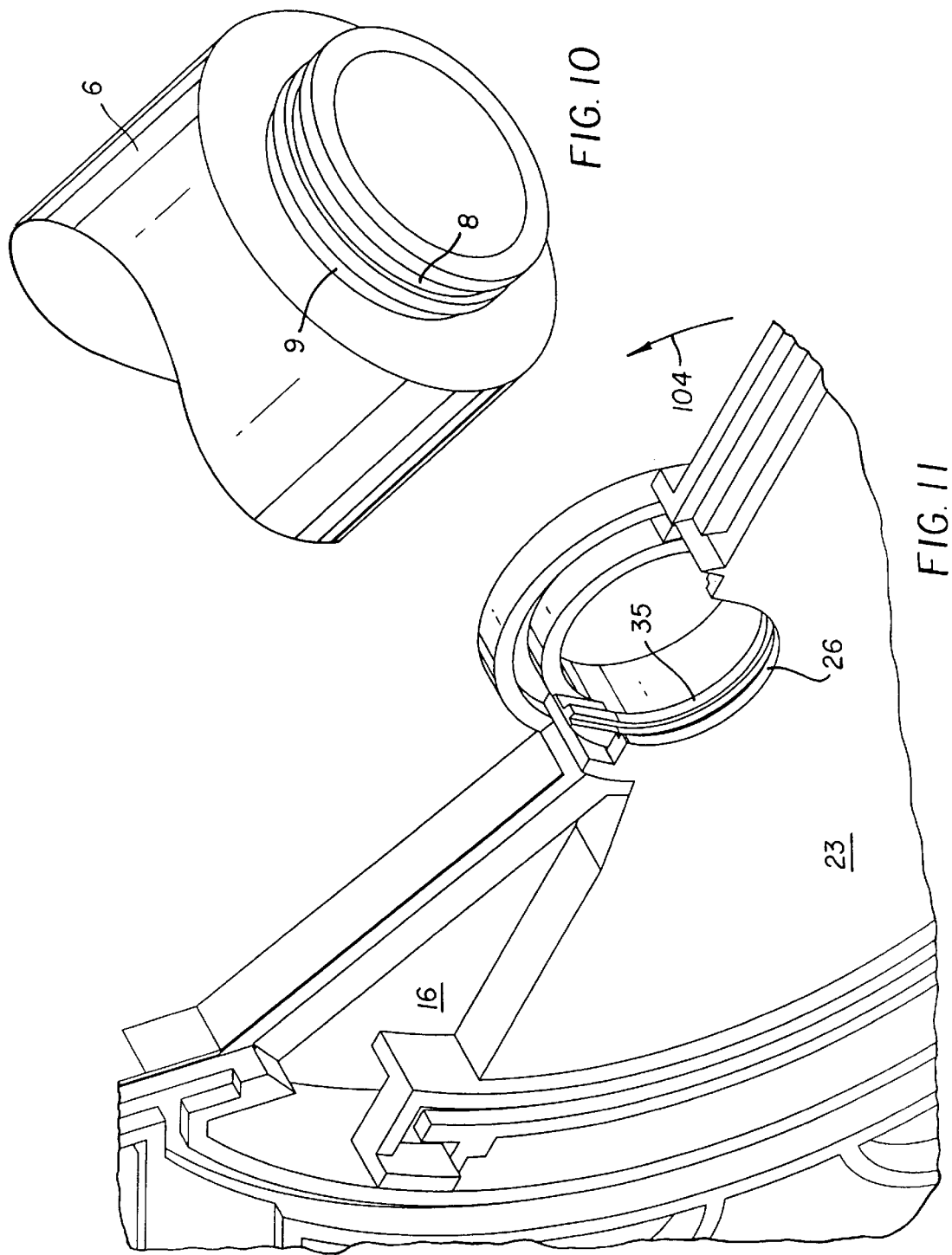

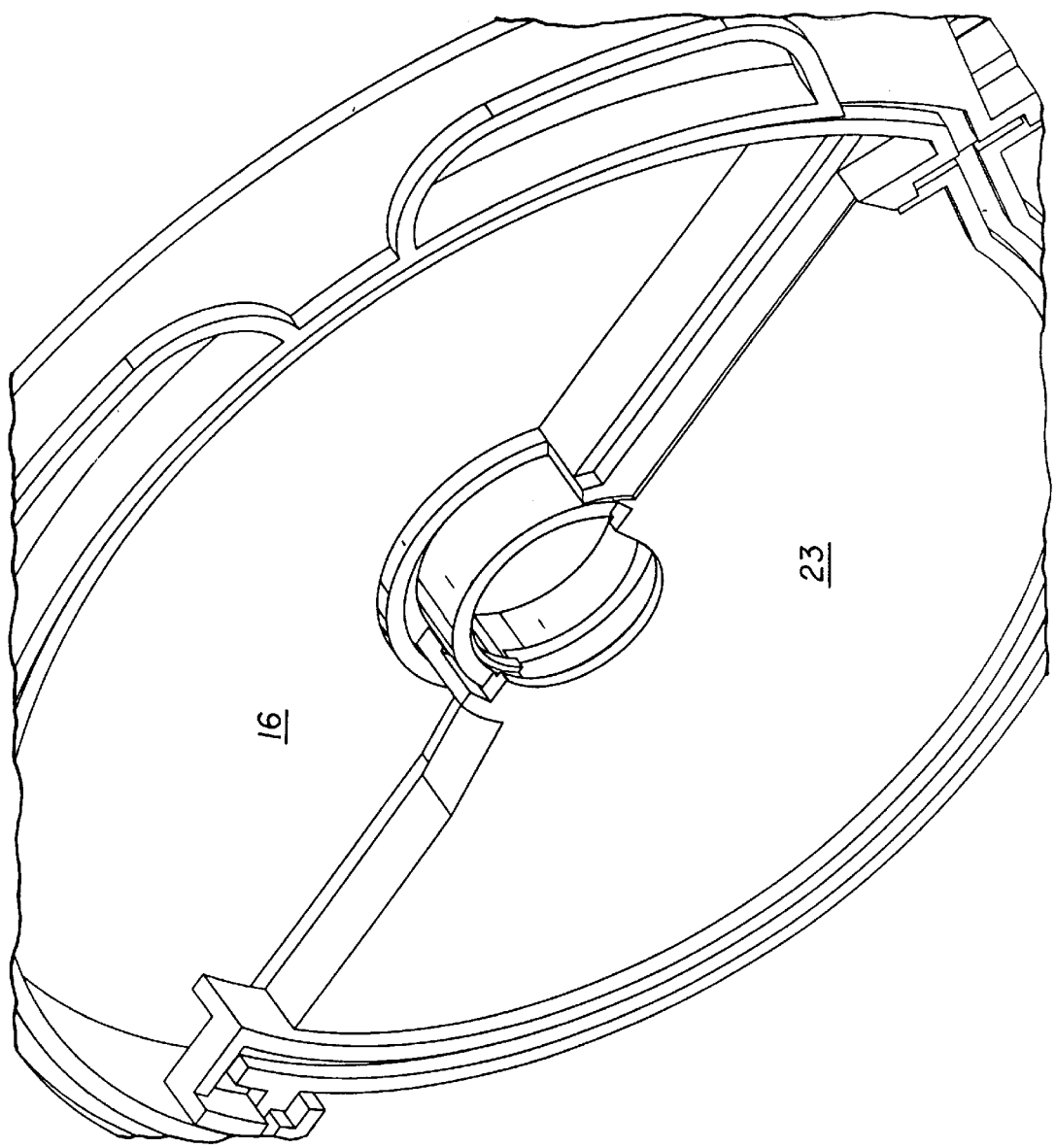

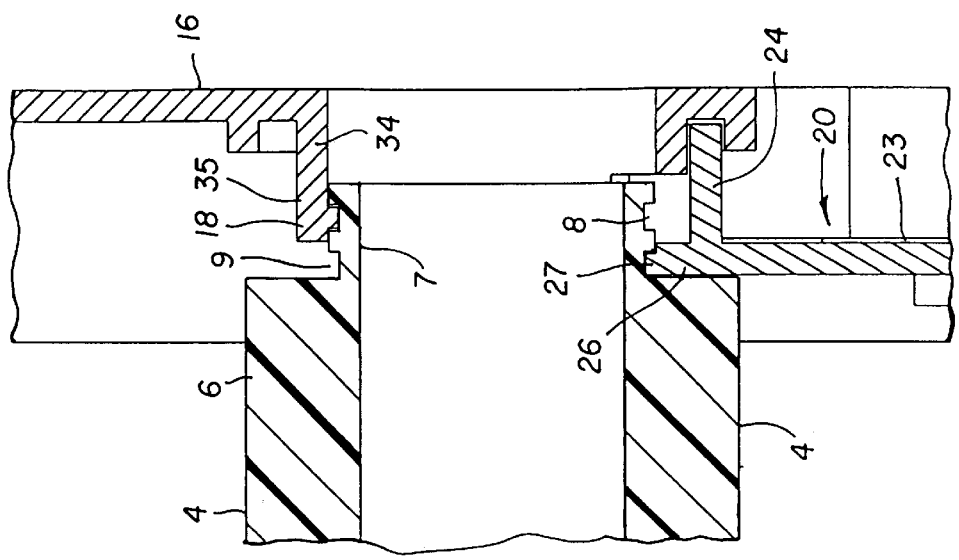
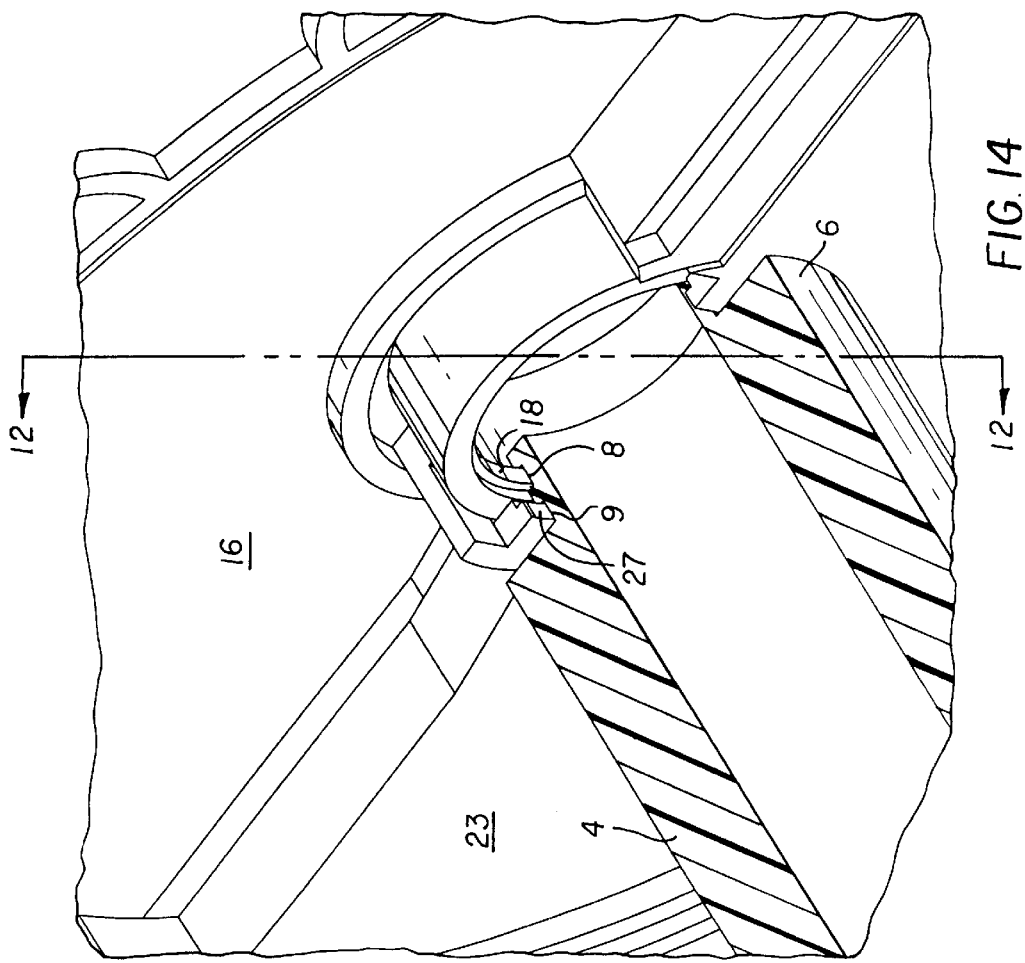

CASSETTE FOR PHOTOSENSITIVE MATERIAL

FIELD OF THE INVENTION

This invention relates generally to the field of photography, and in particular to a cassette for holding and dispensing photosensitive web material.

BACKGROUND OF THE INVENTION

In many photographic applications it is necessary to provide a means for readily dispensing photosensitive material in an apparatus, such as a photographic printer. This requires that some means be provided in which the photosensitive material can be transported to the apparatus in a light tight environment, and conveniently inserted into the apparatus in ambient light conditions. One way of accomplishing this is to provide clamshell-type cassettes. These cassettes have a lower partially cylindrical section, and an upper partially cylindrical section which mate along a common hinge on a first lengthwise edge of each and the second lengthwise edge of each of which abut one another when the cassette is closed. This provides a light tight housing when closed. Seats are provided inside the cassette which allow the web roll to rotate as desired. Pivoting of one section about the hinge, with respect to the other, opens the cassette and allows a web to be inserted into the cassette in a safelight environment. The loaded cassette can then be closed and safely transported to the equipment where it is to be used. Generally, the apparatus in which the web is to be used allows the cassette to be loaded into a chamber of the apparatus in ambient light conditions, then mechanically opens the cassette following closure of a light tight door on the apparatus.

A difficulty with a clamshell type cassette is that pivoting of the one section requires that the apparatus have sufficient room in the cassette chamber to accommodate the increasing space required by the cassette opening. This results in a relatively bulky apparatus simply to accommodate this opening motion. Another cassette is that of the type disclosed in U.S. Pat. No. 2,298,329 or U.S. Pat. No. 3,550,882. In these cassettes one partially cylindrical section rotates inside another to expose an opening, and the photosensitive web is apparently loaded into the cassette in an axial direction following removal of an end of the cassette. Such a disassembly procedure is tedious. Further, the opening is opened during dispensing of web material which allows film inside the cassette to be exposed to stray light inside the apparatus over all the time the cassette is in use. Another difficulty with clamshell cassettes is that when completely open to load a web roll, they can be relatively unstable due to a raised center of gravity. This can cause the clamshell to be readily knocked over particularly in a darkroom environment in which loading occurs.

It would be desirable then to provide a cassette which has a simple means of allowing loading of a photosensitive web roll, which is relatively stable when open for loading, which does not require significant extra space inside an apparatus just to accommodate cassette opening, and which can dispense photosensitive web material in such a way that web material inside the cassette has little exposure to stray light over the time the cassette is in use.

SUMMARY OF THE INVENTION

The present invention then, provides a photographic cassette, comprising a core retainer to rotatably seat a photographic web roll core along an axis of the retainer. The cassette also comprises a housing having exterior and interior members. Each member has a main wall which extends axially and part way around the axis, the main wall of each having an axially extending first margin. One of the members is rotatable around the axis between a closed position in which first margins of the housing members abut one another so that a web roll with a core seated in the core retainer is light tightly enclosed by the housing, and an open position in which the first margins are separated to expose an axially extending cassette opening and in which the rotatable member further radially overlaps the other member than when in the open position.

The rotating member may rotate into a position preferably further inside, or alternatively further outside the other member when moving from the closed to the open position. By further inside or further outside in this context, is referenced that the members have a greater radial overlap with one being inside (closer to the axis) or outside (further from the axis) than the other.

In another aspect of the cassette a core retainer and housing are provided as described above, and a photosensitive web roll is positioned within the housing with ends of the web roll core seated in the core retainer. In this aspect one of the housing members is rotatable around the axis between a closed position in which the web roll is light-tightly enclosed by the housing, and an open position in which the first margins are separated to provide an axially extending cassette opening through which the entire web roll can be passed in a radial direction. In this aspect the first margins preferably abut each other when the rotatable housing member is closed but need not do so.

In a further aspect of the cassette of the present invention the cassette has a core retainer as described above, and exterior and interior housing members. Each of these members in this aspect, has a main wall which extends axially and part way around the axis, and an end wall extending radially inwardly on either end of the main wall. One of the members is rotatable around the axis between a closed position in which a web roll with a core seated in the core retainer is light tightly enclosed by the housing, and an open position in which the main walls further radially overlap and the end walls further axially overlap than when in the open position so as to provide an axially extending cassette opening. This results in a cassette opening being defined where at least part of the rotatable member main wall and end wall were positioned when in the closed position.

In a cassette of the present invention, the core retainer may be constructed to allow placement or removal of a photographic web roll core into the retainer when the rotatable housing member is in the open position and, in response to rotation of the rotatable housing member to the closed position, then prevents radial movement of the core in the retainer.

The present invention also provides a method of loading a cassette of the invention by moving a web roll in a radial direction into the cassette, and a method for dispensing the material of the photosensitive web from between the first margins.

A cassette of the present invention offers one or more of the following: a simple means of allowing loading of a photosensitive web roll, relatively stabilize when opened for loading, does not require significant extra space inside an apparatus just to accommodate cassette opening, and can dispense photosensitive web material in such a way that web material inside the cassette has little exposure to stray light over the time the cassette is in use.

BRIEF DESCRIPTION OF THE DRAWINGS

Embodiments of the invention will now be described with reference to the drawings, in which:

FIG. 10 is an enlarged perspective of an end of a web roll core;

FIG. 11 is an enlarged view, from above, of one end of the cassette of FIG. 5 without the web roll loaded therein and in the open position;

FIG. 13 is an enlarged view, from below, of one end of the cassette of FIG. 5 without the web roll loaded therein and in the closed position;

FIG. 14 is a view the same view as FIG. 13 but also showing a cross-section of a web roll core loaded in the cassette;

FIG. 15 is an axial cross-section looking along the line 12—12 in FIG. 14.

To facilitate understanding, identical reference numerals have been used, where possible, to designate identical elements that are common to the figures.

DETAILED DESCRIPTION OF THE INVENTION

Figure 1:
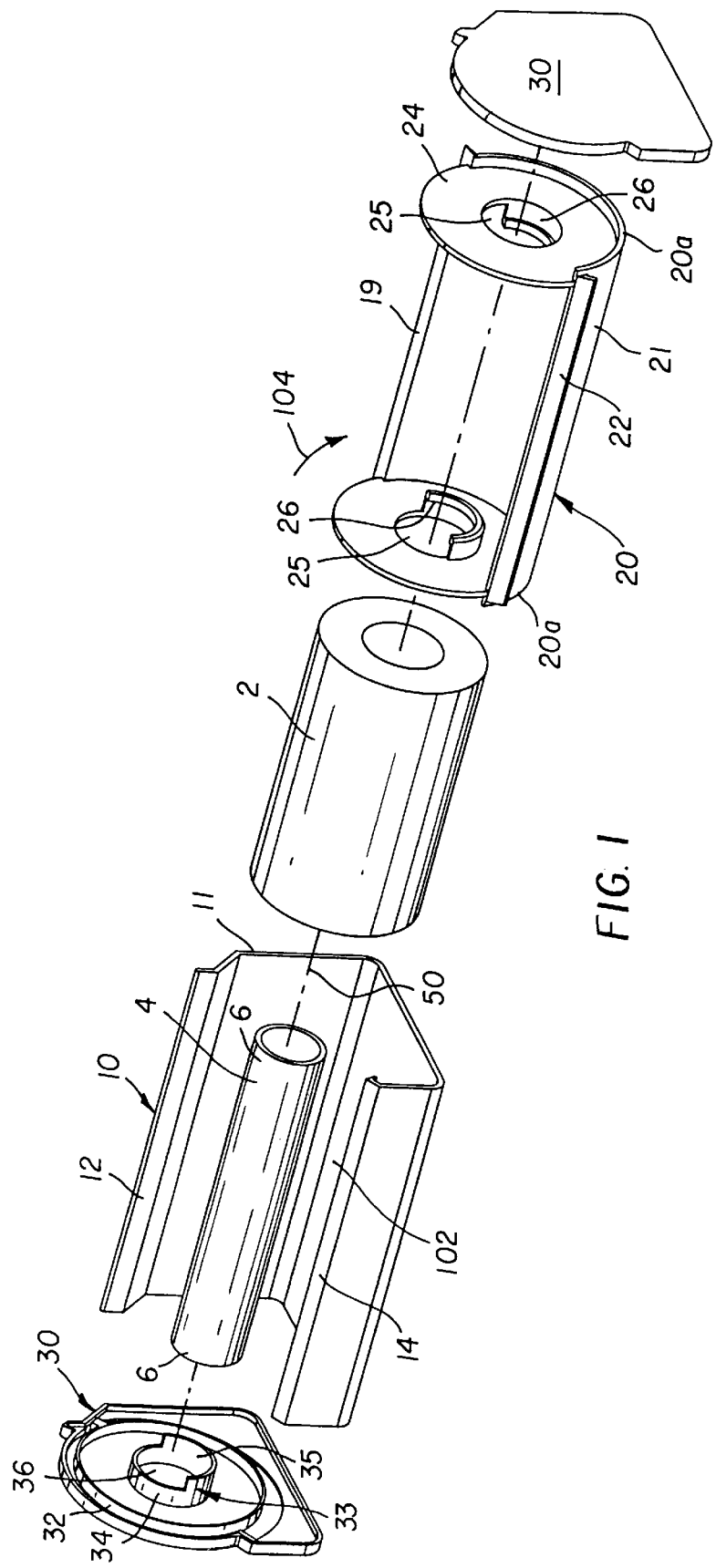
FIG. 1 is an exploded view of a first embodiment of a cassette of the present invention showing also a roll of light sensitive web material for use in the cassette.

Referring to FIG. 1, the cassette shown has an elongated exterior housing member 10 having a main wall 11 which extends in a direction of an axis 50 as well as radially part way around axis 50. Main wall 11 has first and second axially extending margins 12, 14 respectively. A partially cylindrical interior housing member 20 also has an axially extending main wall 21 which curves about axis 50, and two circular end supports 24 each with a circular opening 25 and partially circular axially inwardly extending first collar segment 26 concentric about opening 25. Two opposed end walls 30 are fixedly attached to respective ends of exterior housing member 10 to completely close an end space between corresponding ends of first housing member 10 and second housing member 20 when member 20 is in the closed position described below. Such walls 30 then, being fixed, also close such end spaces when member 20 is in an the open position described below. Each end wall 30 includes a circular guide 32 extending axially inward from an inside surface of end wall 30 and about axis 50. A circular flange 33 extends axially inward from each wall 30, each flange including a partially circular collar segment 35 which extends axially inward further than a second partially circular portion 34. The cassette components can be formed of hard plastic, metal or other opaque materials except as noted.

First margins 12, 22 include a soft covering, of a light sealing cloth material, or the like, such as a plush fabric, which acts as a light lock for the purpose which will become apparent below. As an alternative, less preferred measure, another light lock in the form of a tortuous path (in particular, one or more mating sets of elongated tongues and grooves) could be used.

Adjacent collar segments 26 are concentric and define a collar of a core retainer, with each collar segment 26 positioned slightly axially outward from each collar 35. The two collars so defined lie along the axis 50. A photosensitive web roll 2, includes through its middle a web roll core 4. Opposite ends of core 4 rest within respective collars when the web roll 2 is loaded into the cassette, as illustrated in FIG. 1.

Figure 2:
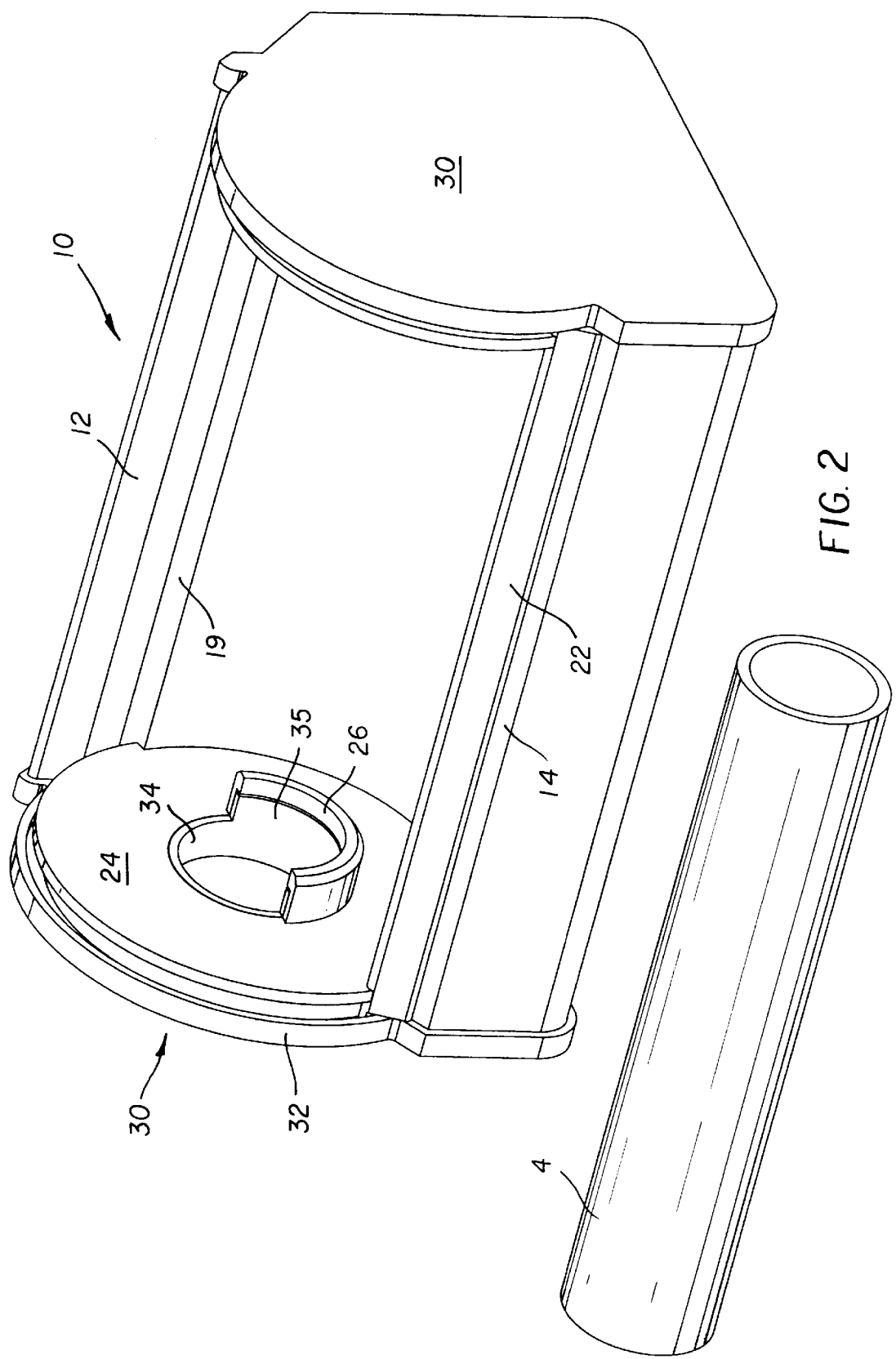
FIG. 2 is a view of the cassette of FIG. 1 in an open position with a web roll core being removed from the cassette (the web roll not shown for clarity)
Figure 3:
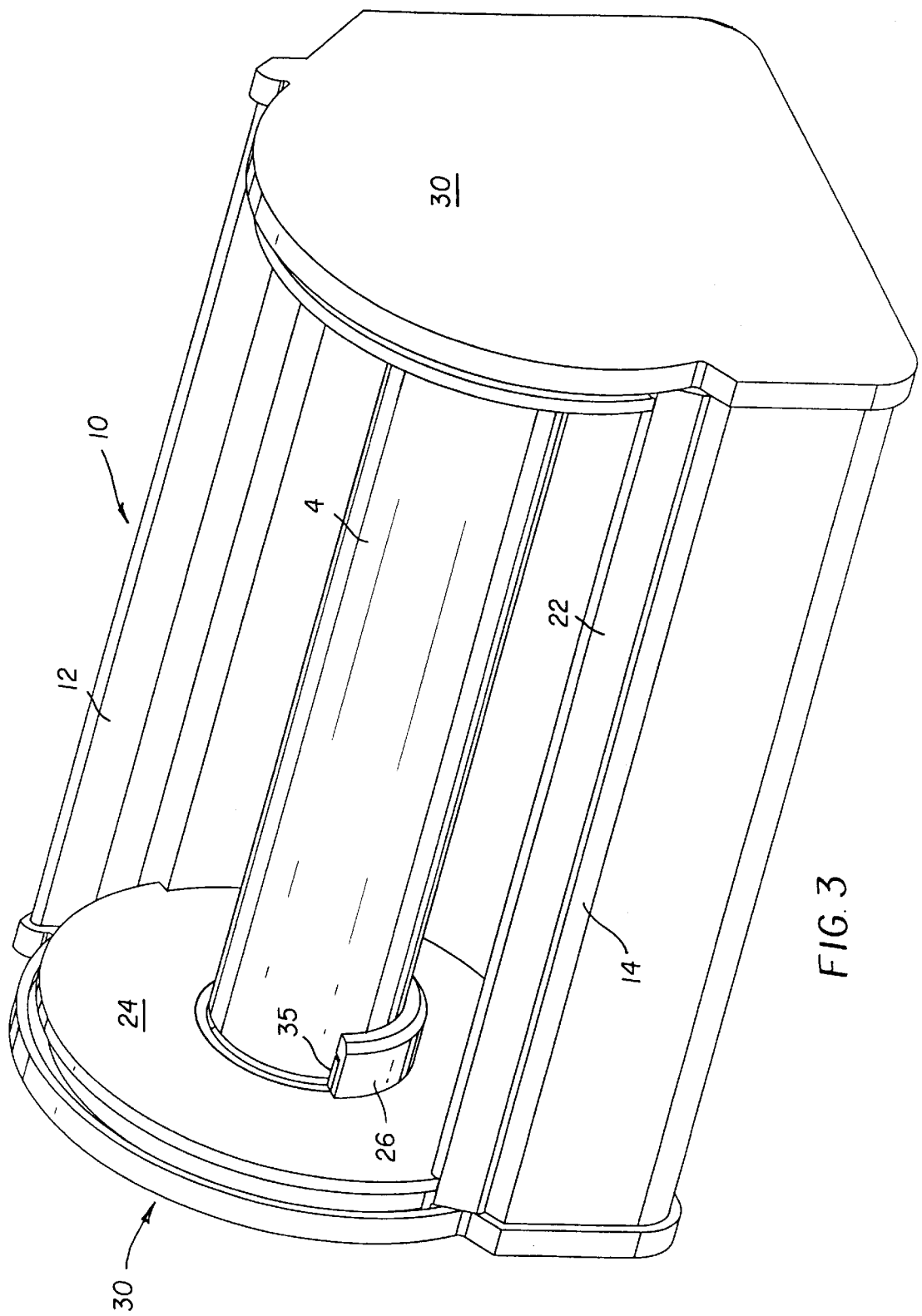
FIG. 3 is a view the same as that of FIG. 2 but with the web roll core seated in the cassette.
Figure 4:
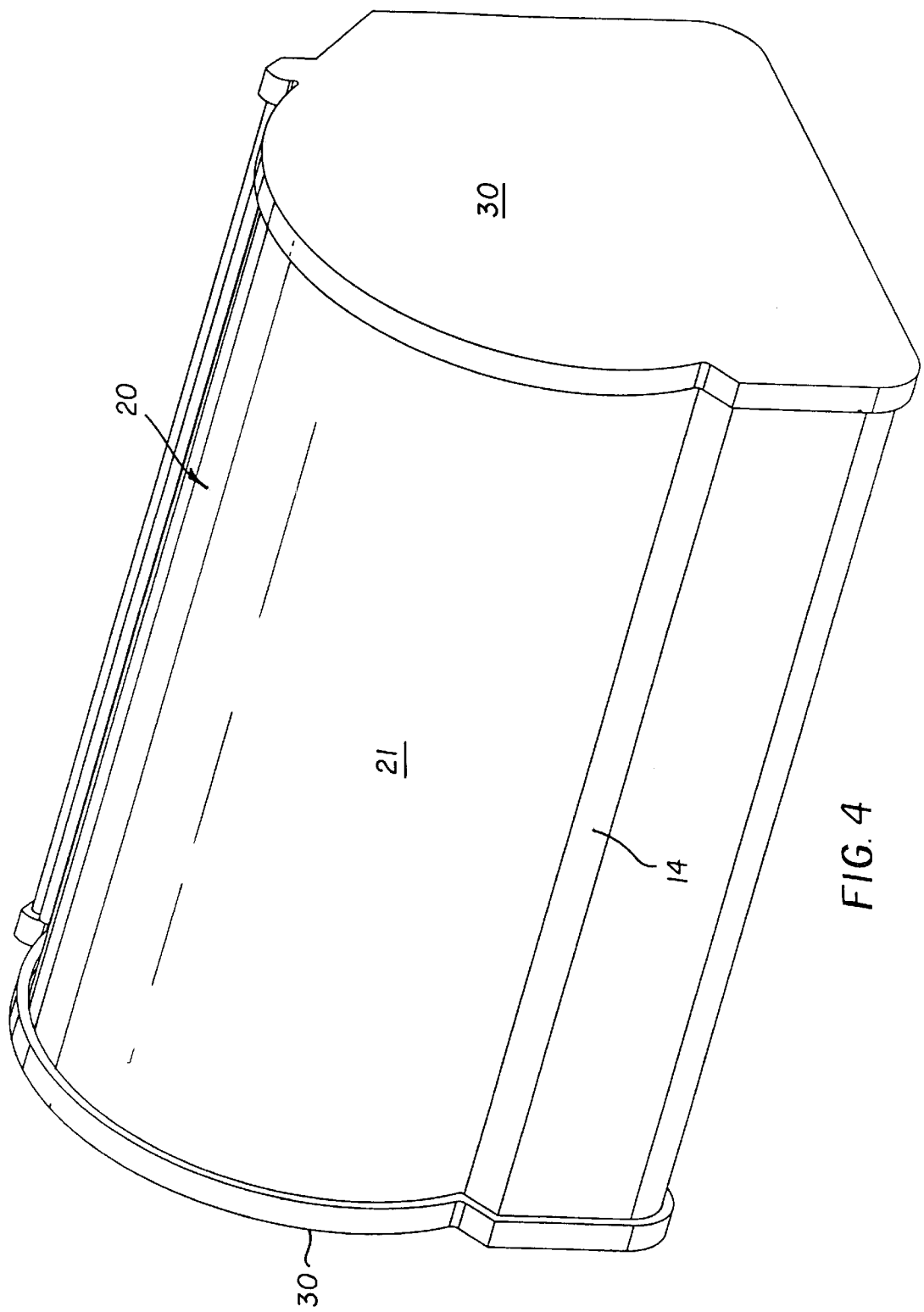
FIG. 4 is a closed view of the cassette of FIGS. 1–3.

Each circular support 24 then, has its opening 25 positioned over circular flange 33 to allow member 20 to rotate around axis 50 between an open position (as shown in FIGS. 2 and 3) and a closed position (as shown in FIG. 4). During such rotational movement opposite end margins 20a of main wall 21 ride on respective circular guides 32.

In the open position, first margins 12, 22 are separated to expose an axially and radially extending cassette opening 102. This opening is large enough to permit roll 2 to be moved in an axial direction through it. Further, in such open position, collar segments 26, 35 of each collar substantially radially overlap each other (with each segment 26 then, being below a corresponding segment 35 of the collar, as viewed in the direction of FIGS. 1–3). This positioning of segment 26 provides an access 36 for an end 6 of core 4 such that each end 6 of core 4 can be removed from, or placed into, a position seated in a corresponding collar (specifically, resting upon a collar segment 35). In the open position, a second margin 19 of member 20 will abut an inside surface of housing member 10 adjacent first margin 12 to limit further rotation in a counterclockwise direction (as viewed from the right hand end wall 30 in FIG. 1).

In the closed position the first margins 12 and 22 abut each other such that the housing encloses the web roll 2 in a light tight manner (in particular light should be blocked from entering the housing when closed so that the photosensitive material of web 2 is not noticeably fogged even after 1 or 2 days, or more). Also in such closed position, each collar segment 26 will have rotated about axis 50, in response to rotation of housing member 20, to a position in which it is opposed to collar 35 to close the access. When the access is closed, the collar segments 26, 35 of each collar restrain each end 6 from axial movement in any direction (that is, they essentially prohibit radial movement, while still allowing rotation of core 4). It will be understood, of course, that there may well be allowed some radial movement of ends 6, but any movement must be limited such that each end 6 remains captured in the corresponding collar when housing member 20 is closed.

The operation of this embodiment is best illustrated in FIGS. 1–4. Note that in use, housing member 10 will normally be held stationary (that is, not rotate around) with respect to axis 50. First, referring to FIG. 2 in particular, to load the cassette, housing member 20 should be manually rotated to an open position about axis 50 to expose a cassette opening 102, if not already in such open position. Web roll 2 may then be inserted in a radial direction through cassette opening 102, and each end 6 of core 4 passed through access 36 such that it is seated on collar segment 35. Housing member 20 can then be manually rotated to the closed position in which web roll 2 is light tightly sealed within the housing. The felt or other light lock along first margins 12, 22 ensure light does not enter the cassette between first margins 12, 22. All of the foregoing steps would normally be done in a darkroom (which may optionally have a safelight). In this closed position, the loaded cassette may be transferred to its destination apparatus. When placed in the apparatus, the photosensitive material of web 2 can be accessed by rotating housing member 20 to the open position, retrieving a free end of the web and pulling it out through opening 102. At this point, housing member 20 can be rotated to the closed position such that the photographic material can be pulled from the cassette from between first margins 12, 22 which provide a light seal even while photosensitive material is being dispensed from the cassette (such an advantage would not be present if a tortuous path light lock was used on first margins 12, 22).

Thus, it will be seen that the above cassette provides a very simple means of allowing loading of a photosensitive web roll. Further, when in the open position for loading web roll 2 it retains its stability since the location of the center of gravity does not change. When the cassette is opened in the apparatus, it does not require any significant extra space inside the apparatus just to accommodate cassette opening (since housing member 20 essentially rotates into a position inside housing member 10). Further, the cassette can dispense photosensitive web material between light sealing first margins 12, 22 such that the remaining web material inside the cassette has little exposure to stray light inside the apparatus over the entire time the cassette is in use in the apparatus.

Figure 5:
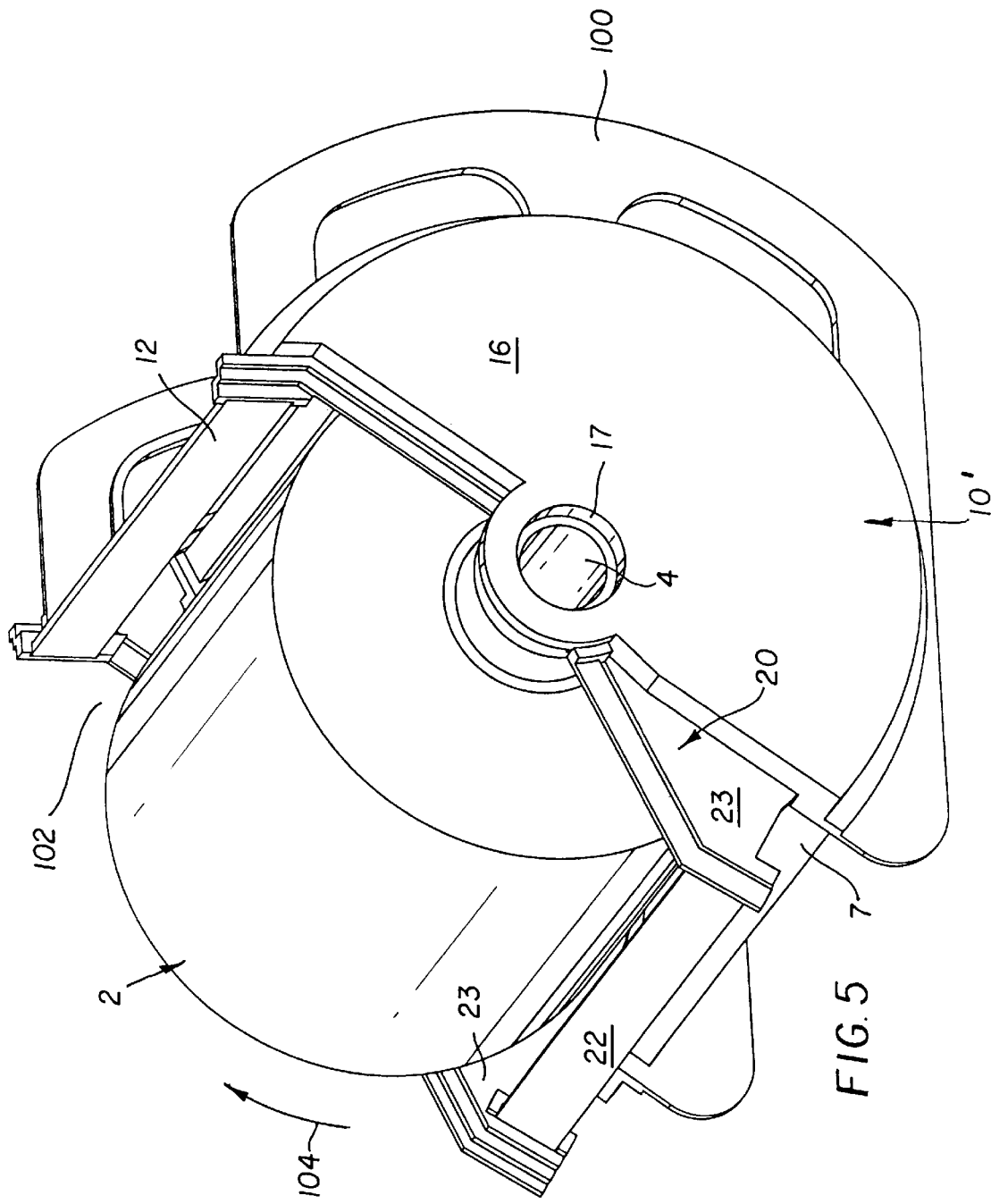
FIG. 5 is a front perspective view of a second embodiment of a cassette of the present invention, showing the cassette open and with a web roll loaded therein.
Figure 6:
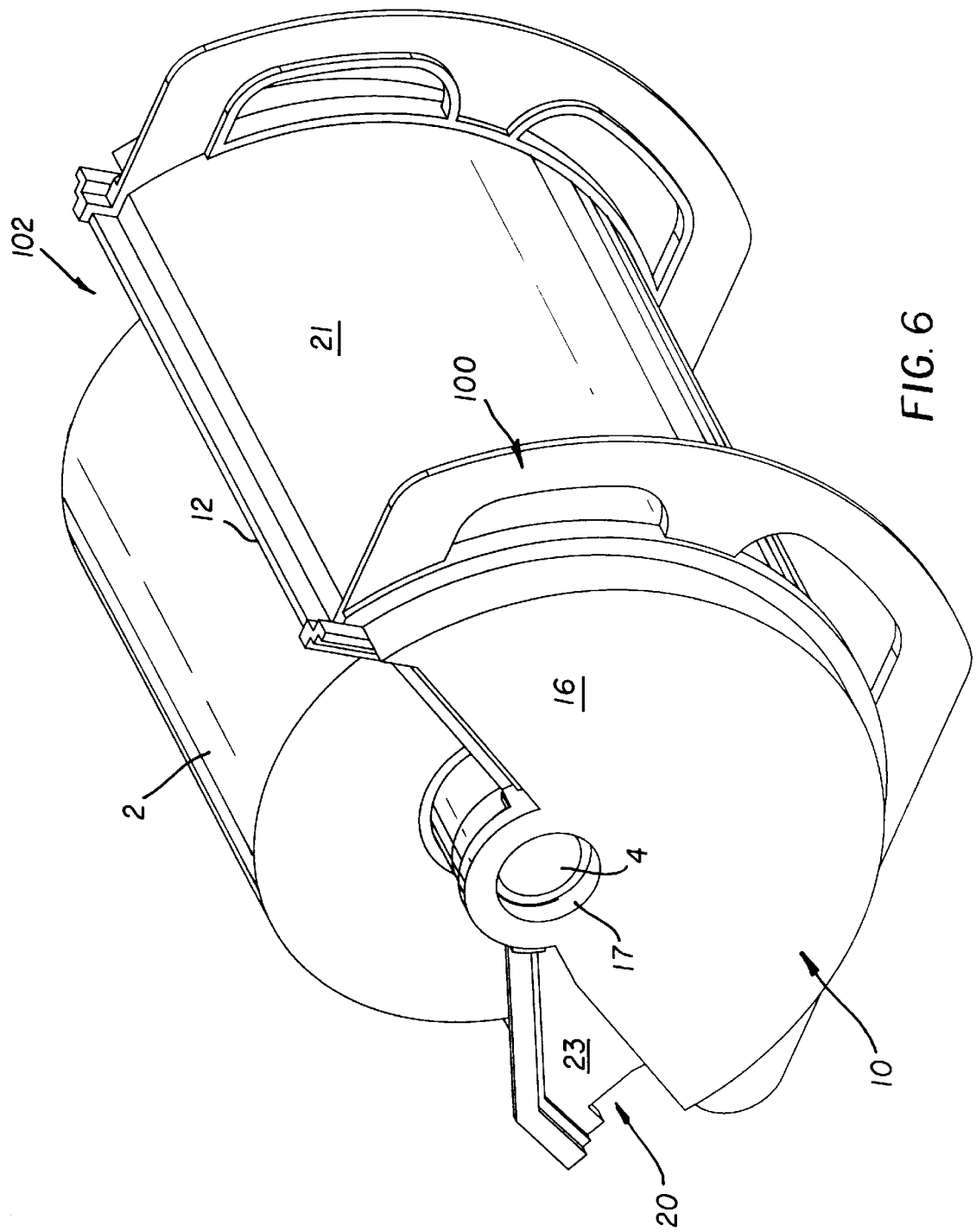
FIG. 6 is a rear perspective view of the cassette of FIG. 5.
Figure 7:
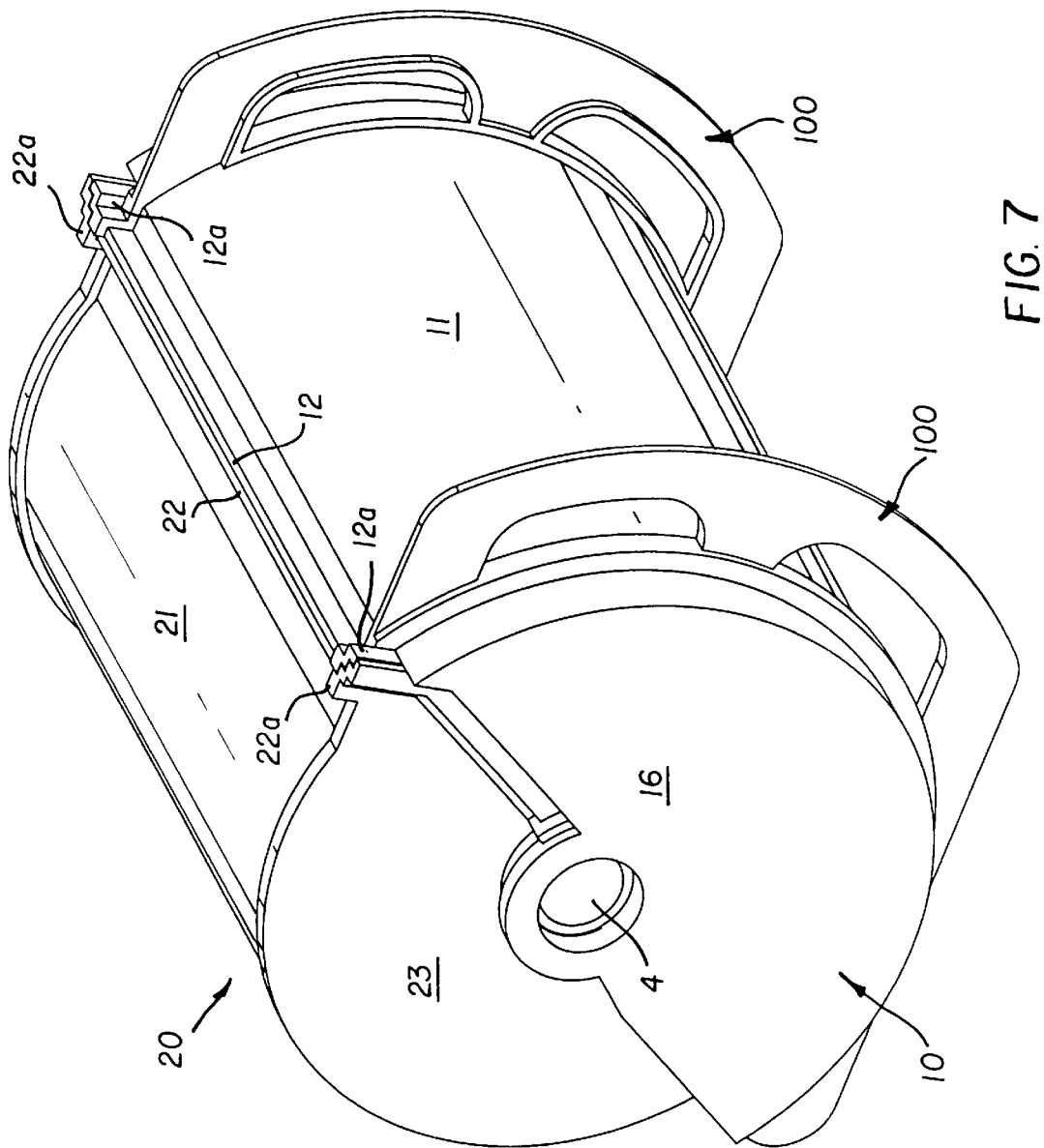
FIG. 7 is a view the same as FIG. 6 but showing the cassette closed.
Figure 8:
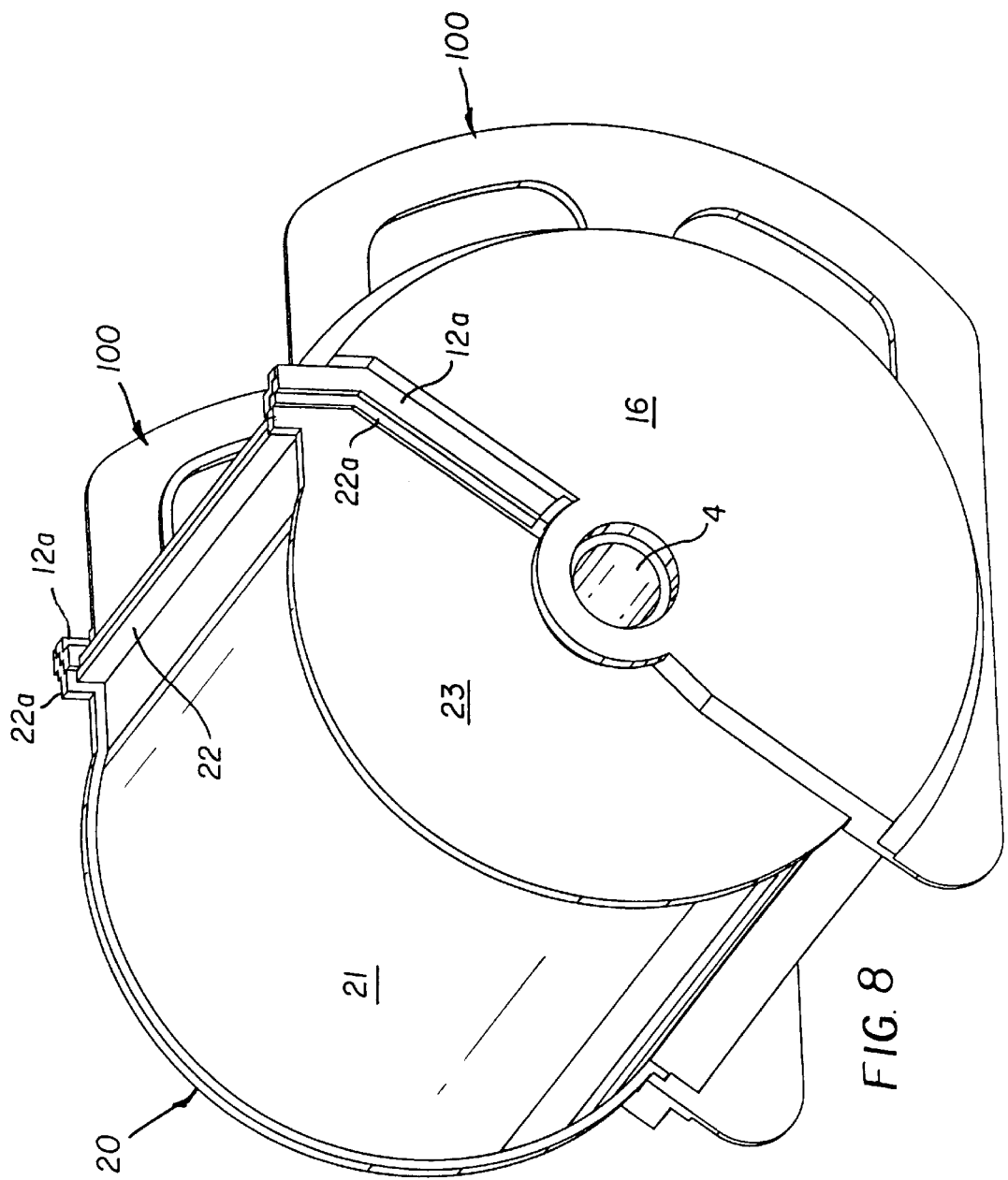
FIG. 8 is a front perspective view of the cassette of FIG. 5 showing the cassette closed.
Figure 9:
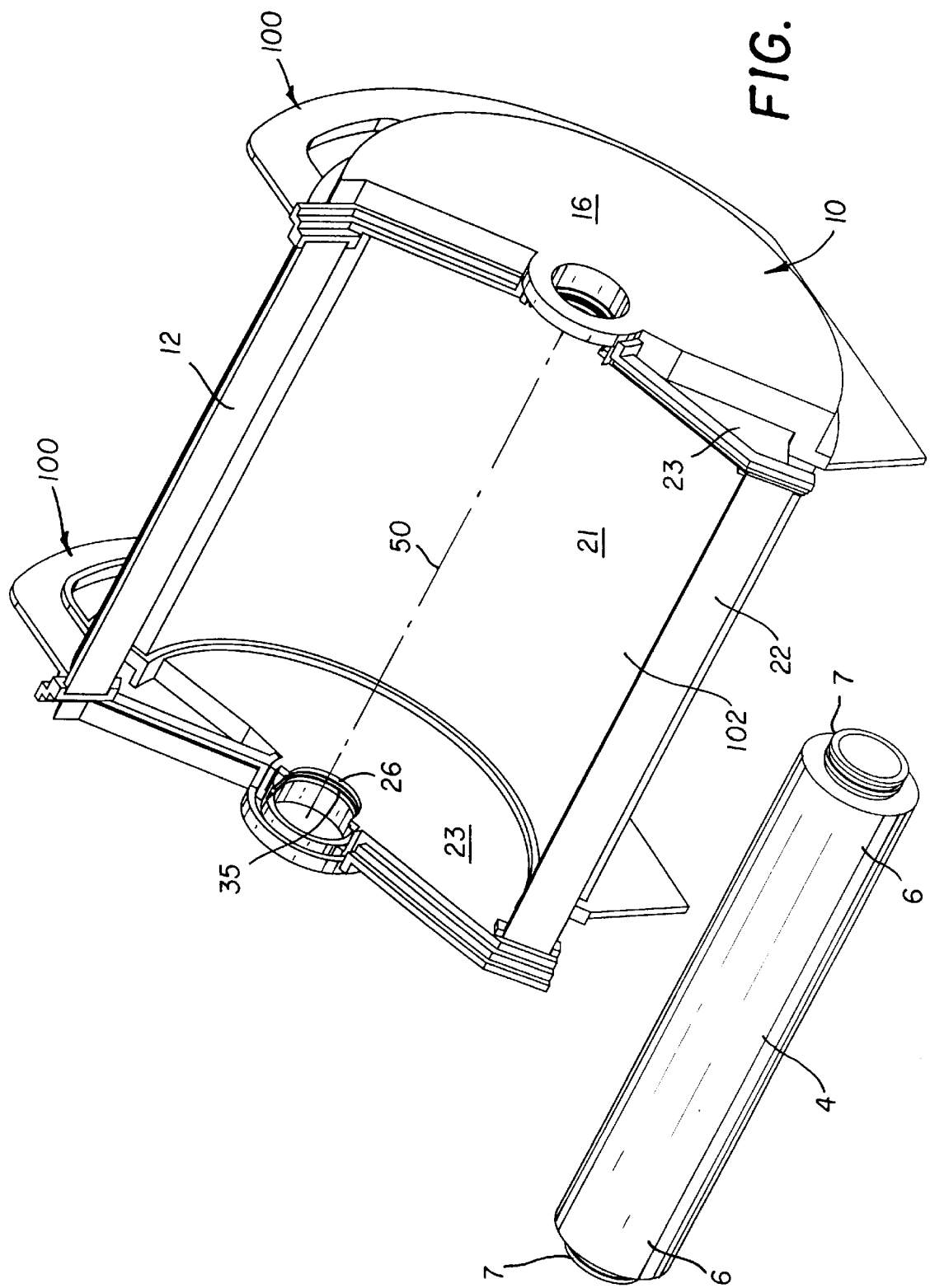
FIG. 9 is a forward perspective view of the cassette of FIG. 5 showing the cassette open and with a web roll core removed.
Figure 12:
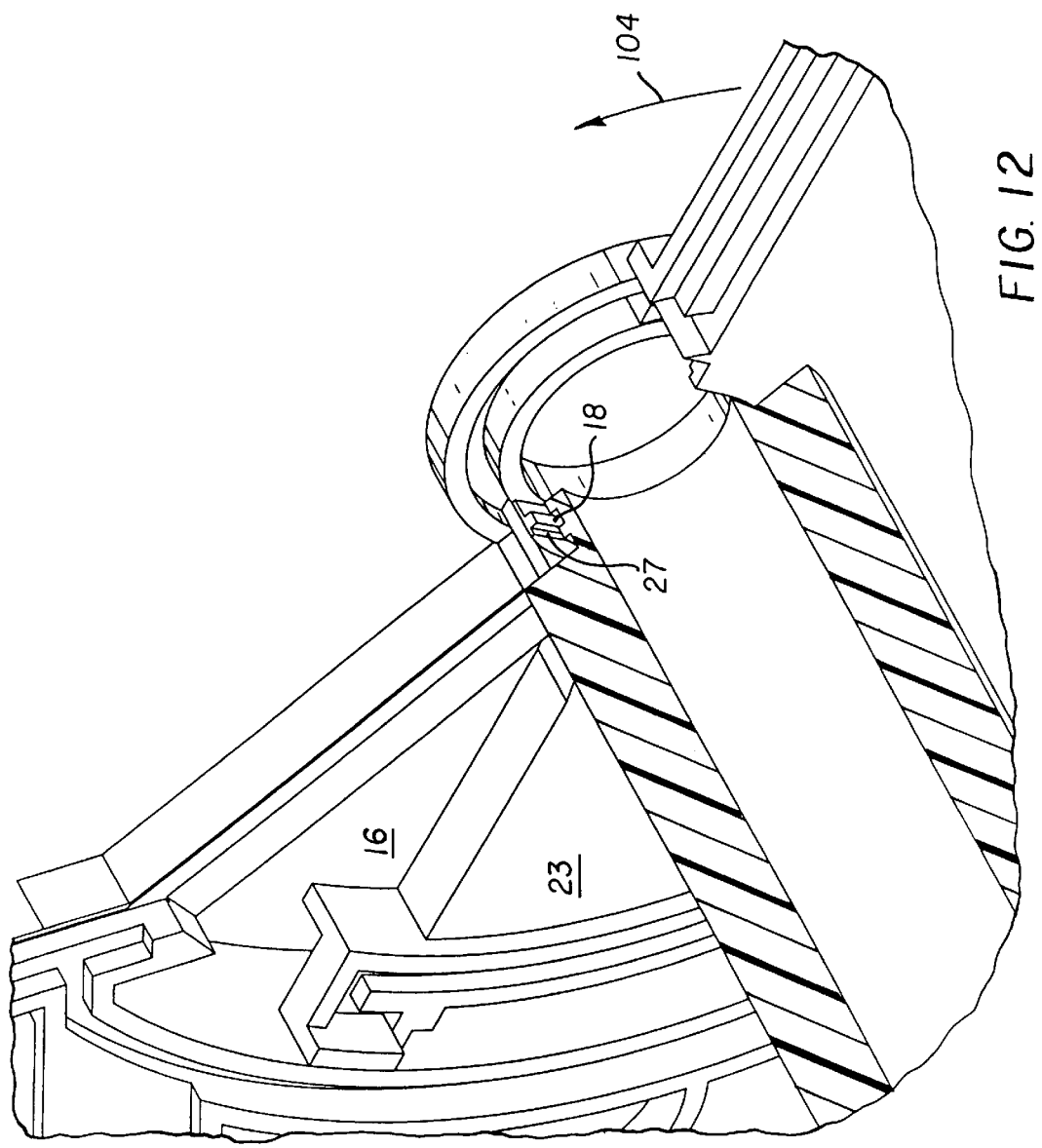
FIG. 12 is a view the same as FIG. 11 but also showing a cross-section of a web roll core loaded in the cassette.

Referring to FIGS. 5–15 a second embodiment of the cassette is shown. This cassette is similar in construction to the cassette of FIGS. 1–4 and similar parts have the same reference numbers. However, in this embodiment external housing member 10' is also partially cylindrical and concentric with housing member 20. Also in the embodiment shown, housing member 20 rotates in a clockwise direction (the direction of arrow 104) from a lower position as seen in FIG. 5 to the closed position, in which first margin 22 of rotatable housing member 20 abuts first margin 12 of the generally stationary housing member 10'. In this embodiment housing member 10' includes on either end of main wall 21, radially inward extending, substantially semi-circular opposed end walls 16 having an axially positioned circular opening 17. Similarly, housing member 20 has such generally semi-circular end walls 23 each with a semi circular axially aligned end opening which acts as collar segment 26. An upwardly facing (as viewed in FIG. 11) axially extending semi-circular opening in each end wall 16 acts as the other collar segment 35.

In this second embodiment, since end walls 16 and 23 are open adjacent the axis, a light-lock mechanism must be provided to prevent light entering the housing between the openings and each end 6 of core 4. This light lock is best seen in FIGS. 11–15. In particular, collar segment 35 has a semi-circular tongue 18 while collar segment 26 has a similar semi-circular tongue 27 spaced axially inward from tongue 18. These tongues mate with corresponding concentric grooves 8, 9 respectively, in each end 6 of core 4 (best seen in FIG. 10). Two handles 100 are also provided in this second embodiment to facilitate manual transportation of the loaded or empty cassette.

This second embodiment functions essentially the same as the embodiment of FIGS. 1–4. However, end walls 23 will move to further axially overlap end walls 16 as housing member 20 is rotated to the open position, as seen for example in FIG. 5. Thus opening 102 is exposed where both main wall 20 and end walls 23 were previously present. This allows a user easy access to the ends of web roll 2 and core ends 6, to facilitate loading and unloading of the cassette. Further, as housing member 20 is rotated clockwise (as viewed in FIG. 5) in this embodiment, tongue 27 of collar segment 26 rotates within groove 9 to a position axially opposite that of tongue 18 of collar segment 35 to effectively light tightly close about each end 6 of core 4.

It will be understood that other variations and modifications can be effected within the spirit and scope of the invention. Accordingly, the present invention is not limited to such specifically described embodiments.

PARTS LIST 2 web roll
4 web roll core
6 end
8 concentric grooves
9 concentric grooves
10 housing member
11 main wall
12 first axially extending margin
14 second axially extending margin
16 end walls
17 circular opening
18 semi-circular tongue
19 second margin
20 housing member
20a opposite end margins
21 main wall
22 margin
23 semi-circular end walls
24 two circular end supports
25 circular opening
26 first collar segment
27 semi-circular tongue
30 opposed end walls
32 circular guide
33 circular flange
34 circular portion
35 collar segment
36 access
50 axis
100 two handles
102 cassette opening
104 arrow

What is claimed is:

1. A photographic cassette, comprising:
   a light-tight housing having:
      a core retainer to rotatably seat a photographic web roll core along an axis of the core retainer;
      an exterior member having an exterior member main wall which extends axially and part way around the axis, said exterior member main wall comprising an axially extending exterior member margin; and
      an interior member having an interior member main wall which extends axially and part way around the axis, said interior member main wall comprising an axially extending interior member margin;

one of said exterior member or said interior member being a rotatable member which is rotatable around the axis between a closed position in which said exterior member margin abuts against said interior member margin so that a web roll with a core seated in the core retainer is light tightly enclosed by the housing, and an open position in which the exterior member margin is separated from the interior member margin to form an axially extending cassette opening, such that in said closed position, said abutting exterior member margin and interior member margin define a light-tight axial exit slot for photosensitive material, and in said open position, said axially extending opening is dimensioned to allow an entire full web roll wound on a core to pass in a radial direction therethrough to be seated into and/or removed from said core retainer.

2. A photographic cassette according to claim 1 wherein said rotatable member is partially cylindrical and concentric about the axis.

3. A photographic cassette according to claim 1 additionally comprising a light lock on at least one of the exterior member margin or interior member margin.

4. A photographic cassette according to claim 1 additionally comprising a photographic web roll having a core with ends seated in the core retainer.

5. A photographic cassette according to claim 1 additionally comprising a photographic web roll positioned within the cassette for dispensing the web through the cassette opening.

6. A photographic cassette according to claim 1 wherein the core retainer allows placement or removal of a photographic web roll core into the retainer when the rotatable member is in the open position and, in response to rotation of the rotatable member to the closed position, prevents radial movement of the core in the retainer.

7. A photographic cassette according to claim 1 wherein in said closed position, the rotatable member overlaps the other member by a first amount, and in said open position, said rotatable member overlaps the other member by an amount greater than said first amount.

8. A photographic cassette according to claim 1, wherein said exterior member margin and said interior member margin abut in a non-overlapping manner.

9. A photographic cassette, comprising:
(a) a core retainer to rotatably seat ends of a photographic web roll core along an axis of the retainer; and
(b) a photographic web roll positioned within a light-tight housing and having a core with ends seated in the core retainer;
(c) said housing having:
exterior and interior members each with a main wall which extends axially and part way around the axis, the main wall of each having an axially extending margin;
wherein one of the exterior and interior members is a rotatable member which is rotatable around the axis between a closed position in which the web roll is light tightly enclosed by the housing, and an open position in which the margins are separated to form an axially extending housing opening through which the entire fill web roll wound on a core can be passed in a radial direction to be seated into and/or removed from said core retainer, such that in said closed position said rotatable member overlaps the other member by a first amount, and in said open position said rotatable member overlaps the other member by an amount greater than said first amount.

10. A photographic cassette according to claim 9 wherein the core retainer allows placement or removal of a photographic web roll core into the retainer when the rotatable member is in the open position and, in response to rotation of the rotatable member to the closed position, prevents radial movement of the core in the retainer.

11. A photographic cassette according to claim 10 wherein the core retainer comprises axially aligned first and second collars, each collar having concentric first and second partially circular axially extending collar segments on respective housing members such that when the rotatable member is in the open position the collar segments overlap one another to provide an access for an end of the core, and when the rotatable member is rotated to the closed position one of the collar segments rotates about the axis to close the access so that the collars prevent radial movement of an end of the core positioned in the core retainer.

12. A photographic cassette according to claim 11 wherein the housing additionally has axially opposed fixed end walls each closing an end space between the main walls of the exterior and interior members when in the open or closed position, and wherein one of the collar segments of each collar is attached to a corresponding end wall.

13. A cassette according to claim 9 wherein the margins of the exterior and interior members abut one another when the rotatable member is in the closed position.

14. A photographic cassette according to claim 9 wherein photosensitive web material is withdrawn from the cassette between the margins of the exterior and interior members when the rotatable member is in the closed position.

15. A photographic cassette according to claim 9 wherein, when the rotatable member is in the open position, a photosensitive web roll having a core is inserted in a radial direction through the cassette opening and ends of the core are seated in the core retainer.

16. A photographic cassette, comprising:
(a) a core retainer to rotatably seat ends of a photographic web roll core along an axis of the retainer; and
(b) a housing having:
exterior and interior members each with a main wall which extends axially and part way around the axis, and an end wall extending radially inwardly on either end of the main wall;
wherein one of the exterior and interior members is a rotatable member which is rotatable around the axis between a closed position in which a web roll with a core seated in the core retainer is light tightly enclosed by the housing, such that the main walls radially overlap, and the end walls axially overlap by a first amount, and an open position in which the main walls radially overlap and the end walls axially overlap by a second amount greater than said first amount so as to provide an axially extending cassette opening;
wherein the core retainer comprises axially aligned first and second collars, each collar having concentric first and second partially circular axially extending collar segments on respective exterior and interior members, such that when the rotatable member is in the open position, the collar segments overlap one another to provide an access for an end of the core, and when the rotatable member is rotated to the closed position, one of the collar segments rotates about the axis to close the access so that the collars prevent radial movement of an end of the core positioned in the core retainer.

17. A photographic cassette according to claim 16 wherein the core retainer allows placement or removal of a photographic web roll core into the retainer when the rotatable housing member is in the open position and, in response to rotation of the rotatable housing member to the closed position, prevents radial movement of the core in the retainer.

18. A photographic cassette according to claim 16 additionally comprising a photographic web roll positioned within the cassette for dispensing the web through the cassette opening, and wherein the cassette opening is sufficiently dimensioned to allow the entire web roll to pass in a radial direction therethrough.

19. A photographic cassette according to claim 16 wherein one of the collar segments of each collar is attached to a corresponding end wall.

20. A photographic cassette according to claim 19 wherein each collar segment has an inside partially circular groove or tongue which, together with mating tongues or grooves, respectively, on each end of the core, provide a light seal at ends of the core when the rotatable member is closed.

21. A photographic cassette according to claim 16 wherein, when the rotatable member is in the open position, a photosensitive web roll having a core is inserted in a radial direction through the cassette opening and ends of the core are seated in the core retainer.

22. A light-tight photographic cassette, comprising:

a first member having a first main wall which extends axially and part way around a central axis, said first member comprising a first wall having an axially extending first abutting surface; and a second member having a second main wall which extends axially and part way around the central axis, said second member comprising a second wall having an axially extending second abutting surface;

one of said first or second members being rotatable around the central axis with respect to the other of said first or second members, between a closed position in which said first abutting surface abuts against said second abutting surface in a light-tight non-overlapping manner, and an open position in which the first and second abutting surfaces are separated from one another to define a cassette opening;

said photographic cassette further comprising a photographic web roll positioned within said cassette, said cassette opening being sized to permit an insertion or removal of an entire full photographic web roll in a radial direction.

* * * * *